US008276191B2

(12) United States Patent
Paul et al.

(10) Patent No.: US 8,276,191 B2
(45) Date of Patent: Sep. 25, 2012

(54) PROVISIONING DATA STORAGE ENTITIES WITH AUTHORIZATION SETTINGS

(75) Inventors: Gaurab Paul, Bangalore (IN); Vasantha Prabhu, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 1037 days.

(21) Appl. No.: 12/112,720

(22) Filed: Apr. 30, 2008

(65) Prior Publication Data

US 2009/0276833 A1 Nov. 5, 2009

(51) Int. Cl.
*G06F 7/04* (2006.01)
(52) U.S. Cl. .............. 726/4; 713/166; 726/26; 709/226; 709/223; 711/114; 711/170; 707/E17.005
(58) Field of Classification Search ................ 726/4, 26; 714/13; 707/9, E17.005; 709/226, 223; 713/166; 711/114, 170
See application file for complete search history.

(56) References Cited

U.S. PATENT DOCUMENTS

| | | | |
|---|---|---|---|
| 6,985,955 B2 * | 1/2006 | Gullotta et al. ............... | 709/229 |
| 7,123,608 B1 * | 10/2006 | Scott et al. .................... | 370/353 |
| 7,137,031 B2 | 11/2006 | Taguchi | |
| 7,222,176 B1 | 5/2007 | Laurent et al. | |
| 2005/0222969 A1 * | 10/2005 | Yip et al. ......................... | 707/1 |
| 2007/0073699 A1 | 3/2007 | Reed | |
| 2008/0243855 A1 * | 10/2008 | Prahlad et al. ................. | 707/9 |

OTHER PUBLICATIONS

Flavio Villanustre and Jarvis Robinson, Data Security and Privacy in Data-Intensive Computing Clusters, Handbook of Data Intensive Computing 2011, Part 3, 467-484, DOI: 10.1007/978-1-4614-1415-5_17.*
Andreas Hanemann,PerfSONAR: A Service Oriented Architecture for Multi-domain Network Monitoring, Service-Oriented Computing—ICSOC 2005, Lecture Notes in Computer Science, 2005, vol. 3826/2005, 241-254, DOI: 10.1007/11596141_19.*
International Search Report PCT/US2009/042177 dated Nov. 26, 2009; pp. 1-3.
Written Opinion PCT/US2009/042177 dated Nov. 26, 2009; pp. 1-3.

* cited by examiner

*Primary Examiner* — Thanhnga B Truong
*Assistant Examiner* — Angela Holmes
(74) *Attorney, Agent, or Firm* — Perkins Coie LLP (57) ABSTRACT

A method and system for generating authorization settings that indicate whether host administrators using a host-based storage-management application are authorized to perform provisioning operations on data storage entities residing on a data storage system are disclosed. Accordingly, a storage-management application receives from an administrator an authorization setting indicating on a per-user basis a set of provisioning operations which can be performed with a data storage entity via the storage-management application. The authorization settings are then communicated from the host-based storage-management application to the storage system where the data storage entity resides, and the authorization settings are stored. A storage-management application executing on any host can then utilize the authorization settings to control which users are allowed to interact with certain data storage entities, and what specific interactions (e.g., provisioning operations) are allowed.

24 Claims, 7 Drawing Sheets

|   | RESOURCE | USER | ALLOW | DISALLOW | DEFAULT |
|---|---|---|---|---|---|
| 1) | set of volumes: /vol/vol1, /vol/vol2_clone | jholl@<alpacino> | {jholl@<alpacino>, TOP.STORAGE.SAN.CONTENT} {kostadis@nisdomain, TOP.SNAP.NFS.PROVISION, TOP.STORAGE.SAN.EXISTING} | {robert@nisdomain, TOP.STORAGE.SAN.EXISTING, TOP.SNAP.NFS.PROVISION} | {ALL,TOP} |
| 2) | set of Qtrees: /vol/vol1/qtree1 | jholl@nisdomain |  |  | {ALL,TOP} |
| 3) | set of luns: /vol/vol1/lunA, /vol/vol2/lunB, /vol/vol2/lunB_clone | robert@nisdomain |  | {hacky@<strawberry>, TOP} | {ALL,TOP} |
| 4) | set of luns: /vol/vol3/lunK | beth@<snake> | {jholl@nisdomain, TOP} |  | {ALL,TOP} |
| 5) | set of volumes: /vol/vol2 | john@nisdomain | {jholl@nisdomain, TOP.SNAP.SAN.PROVISION.CREATE} | {jholl@nisdomain, TOP} | {ALL,TOP} |
| 6) | set of volumes: /vol/vol2, /vol/volM | alp@<jonathan> | {jholl@nisdomain, TOP.SNAP.NFS.SPLIT.CONNECT, TOP.SNAP.NFS.CONNECT} | {ALL, TOP} | {ALL,TOP} |
| 7) | snapshots: mysnap | bill@<alapcino> | {beth@nisdomain, TOP.SNAP.SAN.BACKUP} | {ALL, TOP} | {ALL,TOP} |

FIG. 7

PROVISIONING DATA STORAGE ENTITIES WITH AUTHORIZATION SETTINGS

FIELD OF THE INVENTION

The invention generally relates to data storage systems. More specifically, the invention relates to a method and system for generating authorization settings that indicate whether users of a host-based, storage-management application are authorized to perform provisioning operations on data storage entities residing on a data storage system.

BACKGROUND

One of the challenges faced by information technology (IT) administrators tasked with administering network and computer resources is provisioning and administering those resources. Provisioning resources generally involves configuring the resources (e.g., computers, routers, file servers, network-attached storage (NAS) systems, and disk arrays configured for use in storage area networks (SANs)) for use in a particular computing environment, and providing users with access to those computer resources. For example, an administrator may configure authorization settings that permit certain users to access and use certain resources, while others without the proper authorization settings are restricted from accessing and using those resources.

When a host or server computer is configured to use a NAS or SAN system, it is generally the host or server administrator that is responsible for provisioning storage on the NAS or SAN system for use with the host or server computer. In the context of a NAS or SAN system, storage provisioning generally involves the creation of data storage entities (e.g., disk groups, volumes, logical unit numbers (LUNs), qtrees, and snapshots) on the storage system. For example, before an application executing on a host or server computer can utilize the data storage services of a NAS or SAN system, a host or server administrator generally needs to create a volume on a virtual disk (e.g., a LUN) of the storage system. Once the volume and LUN have been created on the storage system and the host or server has been configured to use the volume and LUN, an application that requires locally-attached storage, such as Oracle® database, Microsoft® Exchange or SQL server, can begin utilizing the volume on the storage system. To create these data storage entities on a NAS or SAN system, the host or server administrator often utilizes a storage-management application that resides, and executes, on the host or server computer. For instance, one such storage-management application is SnapDrive®—a software product available from Network Appliance® of Sunnyvale, Calif.

When a NAS or SAN system is utilized in an enterprise storage solution, many host or server computers may be configured to utilize the data storage services of the NAS or SAN system. Furthermore, several host or server administrators may be responsible for provisioning storage (e.g., creating and configuring data storage entities) on the NAS or SAN system for use with various host or server computers. For example, a provisioning administrator may generate a volume, while a backup administrator may generate snapshots. Consequently, it is important to have security mechanisms in place to prevent one administrator from accidentally or purposefully changing, deleting, undoing or otherwise modifying a data storage entity on the storage system that has been created by another administrator.

One way this is accomplished is by limiting access to the storage system or the storage-management application that enables the provisioning operations. For example, access to the storage system or the storage-management application may be limited to certain administrators by requiring all administrators to provide a user name and/or password in order to access the host on which the storage-management application resides, or alternatively, in order to access the storage-management application itself. However, medium- and large-sized enterprises often have a wide variety of hosts and/or servers executing a variety of applications, and consequently utilizing significant amounts of storage. With medium- to large-sized enterprises, there is often a need for several host and/or server administrators. As the number of host and/or server administrators increases, it becomes more likely that one administrator may purposefully or accidentally, change, delete, undo or otherwise modify a data storage entity that has been created by another administrator. Consequently, the effectiveness of user name/password protection in a medium- to large-sized entity is limited.

Another way in which access to a storage-management application and the authority to perform provisioning operations may be controlled is through the use of host- or server-specific user privileges. For instance, many operating systems provide a mechanism for assigning certain privileges or permissions to users by associating a user with certain roles or groups. For instance, a user may be granted root or administrative privileges. Accordingly, users who have been assigned certain roles (e.g., a root user) or users who have been made a member of certain groups (e.g., an administrator group) may have the authority or permission to execute commands and/or applications that other users are not authorized to execute. In particular, a root user, or a user belonging to an administrator group may be authorized to access and use a storage-management application residing on a host or server. However, this type of security mechanism has many of the same problems as a user name/password security mechanism. As the number of users authorized to use storage-management applications increases, so too does the likelihood that one user will purposefully or accidentally change, delete, undo or otherwise modify a data storage entity originally provisioned by another user.

Furthermore, neither of the security mechanisms described above provides for flexibility in defining a security policy for data storage entities of a storage system. Specifically, with the security mechanisms described above, there is no way to effectively authorize an administrator to perform a subset of the set of provisioning operations that are made possible by a host- or server-based storage-management application. For instance, with a user name/password security scheme, an administrator who has the proper user credentials (e.g., user name and password) to access the storage-management application is authorized to perform all provisioning operations. A user without the proper credentials is prevented from performing any provisioning operations, including those provisioning operations that pose little or no risk of harm to the existing configuration of the storage system. Similarly, in a security scheme where an administrator's authority to access a storage-management application is tied to an OS-specific privilege (e.g., root user or administrator group), there is no way to provide the administrator with the authority to perform a particular provisioning operation without providing that administrator the additional bundle of privileges that come along with the specific user privilege. Consequently, not only does a user with an effective privilege have authority to perform all of the provisioning operations enabled by the storage-management application, the privilege may also have the undesired effect of providing the user with the authority to access other administrative resources.

SUMMARY

A method and system for generating authorization settings that indicate whether users of a host-based storage-management application are authorized to perform provisioning operations on data storage entities residing on a data storage system are disclosed. Accordingly, a host or server computer executes a storage-management application for provisioning and otherwise administering a data storage system, which is connected to the host or server via a network. The storage-management application receives, from a user (e.g., an administrator of the host or server), authorization settings indicating on a per-user basis a set of provisioning operations that one or more users are allowed to perform on specific data storage entities residing on the data storage system via the data-management application. For example, an authorization setting may indicate that a particular user is allowed to create, delete, rename, and resize a particular volume on the data storage system. The authorization settings are then communicated from the storage-management application to the data storage system where the data storage entity resides and the authorization settings are stored.

In yet another aspect, when the storage-management application receives a user-request to perform an operation on a particular data storage entity, the storage-management application first verifies that a user associated with the user-request has been granted the proper authority to perform the particular operation. For example, the storage-management application accesses the previously generated authorization settings to determine whether the user has been granted the proper authorization to perform the requested operation. Because the authorization settings are stored at the data storage system, authorization settings generated by a storage-management application of a first host or server can be utilized by a storage-management application executing on a second host or server. In this way, the authorization settings prevent an administrator of the second host or server from purposefully or accidentally modifying a data storage entity provisioned by an administrator of the first host or server.

Other aspects of the invention will become apparent from the description that follows.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

A method and apparatus for generating authorization settings that indicate whether users of a host-based storage-management application are authorized to perform provisioning operations on data storage entities residing on a data storage system are disclosed. A storage-management application executing on a host or server enables an administrator of the host or server to provision storage on a network-connected data storage system (e.g., a NAS or SAN system). In particular, the storage-management application enables an administrator to generate or create data storage entities (e.g., a volume) at the data storage system for use by the host or server. As part of the procedure for provisioning data storage entities, the storage-management application enables a host or server administrator to generate authorization settings, which indicate whether other administrators of a host or server are authorized to perform provisioning operations on a particular data storage entity.

Consistent with one embodiment of the invention, the authorization settings control which administrators are allowed to interact with the various data storage entities via a storage-management application and what type of interactions are allowed. Specifically, the authorization settings control which provisioning operations, if any, an administrator is allowed to perform on a particular data storage entity. For example, the authorization settings may control whether a particular administrator is allowed to create, delete, rename or resize a volume. Similarly, the authorization settings may control whether a particular administrator is allowed to enable a host to connect to, or disconnect from, a particular LUN on the storage system. In general, the authorization settings control provisioning-type actions facilitated by a storage-management application or host-based operating system. These provisioning-type actions should not be confused with conventional file system supported actions (such as writing a file to, or reading a file from, an existing volume), which are generally subject to a separately implemented security policy or mechanism. The authorization settings generated by the storage-management application are stored at the storage system where the data storage entities reside, and are therefore accessible by any storage-management application that is configured to use the storage system.

Advantageously, an embodiment of the invention allows administrators to implement a flexible and persistent, enterprise-wide, security policy for data storage entities. Because the authorization settings are defined in such a way as to authorize or deny permission to an administrator on a provisioning operation and data storage entity basis, the authorization settings allows for greater flexibility in establishing a security policy than is possible with conventional security mechanisms. By way of example, the authorization settings associated with a particular data storage entity (e.g., a volume) may specify that a first administrator is authorized to perform a certain subset of possible provisioning operations on that particular data storage entity, while a second administrator is authorized to perform a different, more limited subset of the possible provisioning operations. The authorization settings for another data storage entity, however, may provide the second administrator with a broader subset of possible provisioning operations, while limiting or all together prohibiting the first administrator from performing provisioning operations on the particular data storage entity.

The flexibility provided by an embodiment of the invention is in contrast to a conventional user name/password security scheme, where each administrator is either authorized to access, or prohibited from accessing, the storage-management application based on a user name and password provided to the administrator. In a user name and/or password scheme, an administrator with authorization to access the storage-management application is allowed to perform all provisioning operations on all data storage entities, while an administrator who is not authorized to access the storage-management application is prohibited from performing any provisioning operations on all data storage entities. This flexibility in defining the security policy for data storage entities facilitated by an embodiment of the invention is also in contrast to security mechanisms based on the granting of certain OS-specific privileges. For instance, under an OS-specific security mechanism, to access the storage-management application a user must generally be assigned root-user privileges, or be included in an administrators group. Although this will enable the user to access the storage-management application and perform provisioning operations, this has the often undesirable effect of granting the user the authority to access other administrative resources (e.g., executable administrative applications and commands). Consistent with an embodiment of the invention, by simply defining the proper authorization settings, a non-root user can be provided with a very specific and limited authorization to perform certain provisioning operations on certain data storage entities, without broadly granting the user the authority to execute and access other administrative resources.

As used herein, the term "data storage entity" is used to refer to any type of conceptual data container used by a data storage system for storing data. For example, a data storage entity includes, (but is not necessarily limited to): disk groups, volumes, LUNs, qtrees, and snapshots. It will be appreciated by those skilled in the art that other conceptual storage containers with properties similar to those listed here may also be considered data storage entities for purposes of the invention. Furthermore, as used herein, the terms "administrator", "server administrator", and "host administrator" are in essence synonymous with the term "user", and generally refer to any person or user who utilizes a host-based storage-management application to provision resources on a storage system. Finally, and as briefly described above, the authorization settings provide a means of defining a security policy for provisioning operations. As used herein, "provisioning operations" include any operations enabled by a storage-management application that are directed to, or involve, one or more data storage entities. Provisioning operations generally will involve those operations enabled by a storage-management application for generating, modifying, displaying, listing, or otherwise manipulating a data storage entity or the attributes or properties thereof.

Reference will now be made in detail to an implementation consistent with the present invention as illustrated in the accompanying drawings. Wherever possible, the same reference numbers will be used throughout the drawings and the following description to refer to the same or like parts. Although discussed with reference to these illustrations, the present invention is not limited to the implementations illustrated therein. Hence, the reader should regard these illustrations merely as examples of embodiments of the present invention, the full scope of which is measured only in terms of the claims following this description.

Figure 1:
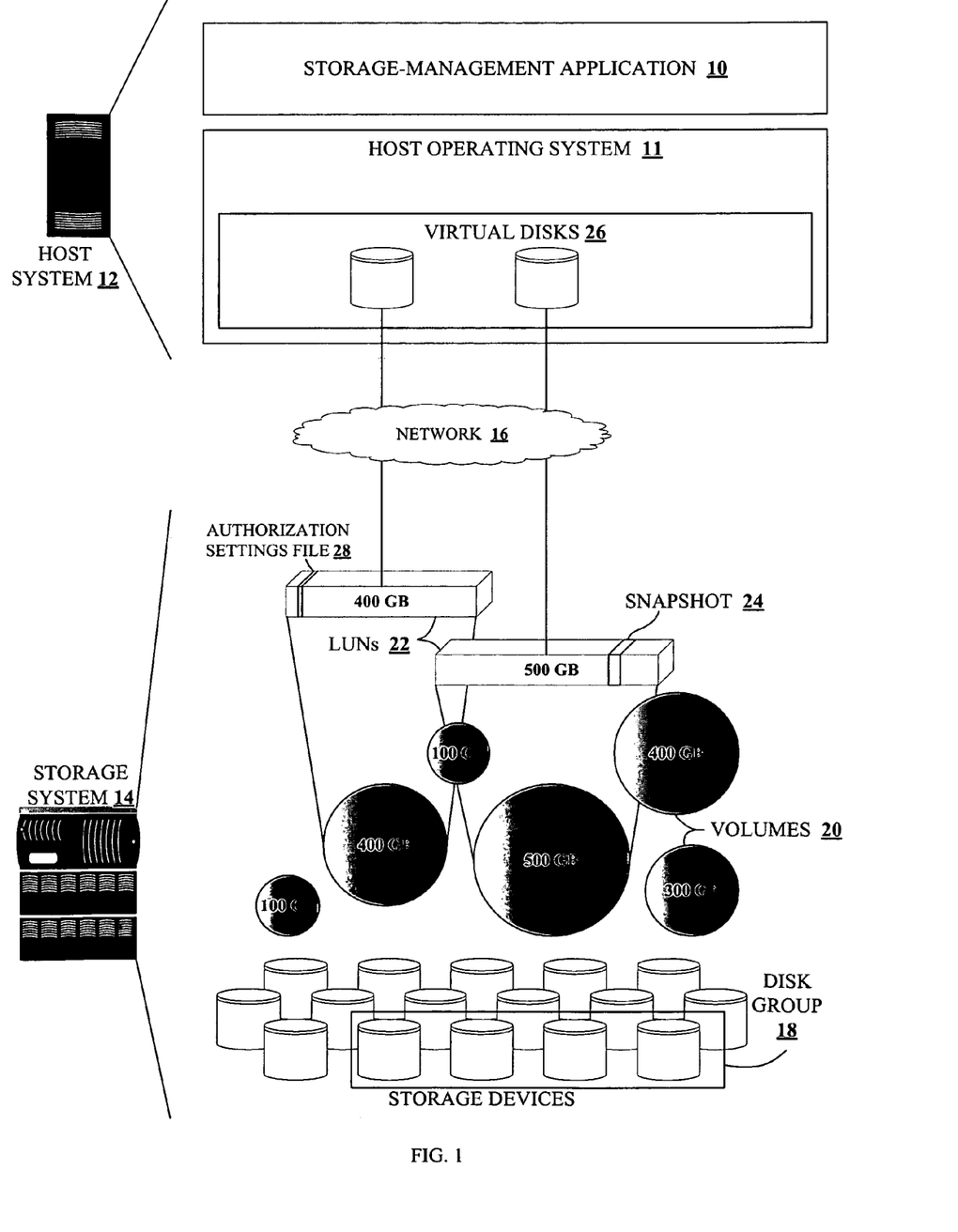
FIG. 1 illustrates an example of a network environment including a host-based storage-management application for provisioning data storage entities and generating authorization settings for those data storage entities, according to an embodiment of the invention.

FIG. 1 illustrates an example of a network environment including a host-based, storage-management application 10 for provisioning data storage entities at a data storage system 14 and generating authorization settings 28 for those data storage entities, according to an embodiment of the invention. As illustrated in FIG. 1, the network environment includes a host computer system 12 communicatively coupled to a storage system 14 by means of a network 16. The host computer system 12 may be a conventional computer system, such as a server, desktop or workstation, having a central processing unit (CPU), random access memory (RAM), read only memory (ROM), and a magnetic or optical, non-volatile storage device (e.g., a direct-attached storage device, such as a hard disk drive). The host computer system may be executing any number of operating systems to include a version of a Microsoft Windows® operating system, or a variety of the UNIX operating system (e.g., Solaris® or Linux). The storage-management application 10 executing on the host computer system is referred to herein as "host-based" because it resides and executes on a host or server computer system other than the data storage system 14 that the storage-management application 10 is designed to manage.

In general, the storage-management application 10 automates the tasks associated with provisioning storage on the storage system 14. Accordingly, an administrator for the host computer system 12 can utilize the storage-management application 10 to create data storage entities (e.g., disk groups, volumes, LUNs, qtrees, and snapshots) on the storage system 14 for use with the host computer system 12. For example, using the storage-management application 10, a host administrator may create a LUN 22 on the storage system, assign a volume 20 to that LUN 22, and then mount the LUN 22 to the host system 12 as a virtual disk 26.

As part of the process for provisioning storage, the storage-management application 10 also enables an administrator to generate authorization settings for data storage entities. An authorization setting is a rule defining which users (e.g., host or server administrators) are authorized to perform, or prohibited from performing, certain provisioning operations on a data storage entity via a storage-management application 10. For example, in one embodiment of the invention, each data storage entity will have associated with it an authorization setting defining which administrators can perform certain provisioning operations, and which administrators are prohibited from performing certain provisioning operations, on that data storage entity. The authorization setting for a particular data storage entity defines not only the specific administrators to whom the rule applies, but also the particular provisioning operations that the administrators are authorized to perform, or prohibited from performing. For example, an authorization setting for a volume may authorize an administrator to resize the volume, but prohibit the administrator from renaming the volume. Similarly, an authorization setting for a volume might enable administrator A and administrator B to perform a snapshot operation on the volume, while allowing administrator A to restore the snapshot data and prohibiting administrator B from restoring the snapshot data. As described in greater detail below, administrators are provided significant flexibility in generating the underlying rules included in an authorization setting for a data storage entity.

In one embodiment of the invention, the storage-management application 10 enables an administrator to generate an authorization setting for a data storage entity at the time the data storage entity is being generated. For example, when an administrator initially generates a data storage entity, the storage-management application 10 may prompt or request the administrator to provide input defining the authorization setting for that data storage entity. In one embodiment of the invention, the administrator may opt for using a default authorization setting for that type of data storage entity. For example, in one embodiment of the invention, each different type of data storage entity may have its own default authorization setting. Accordingly, when an administrator opts to not provide a custom authorization setting when generating a data storage entity, the storage-management application 10 will automatically utilize the default authorization setting when generating the data storage entity. The particular administrators and allowed operations specified in a default authorization setting will generally be different for each type of data storage entity—for instance, disk groups, volumes, LUNs, qtrees, and snapshots.

In addition to creating authorization settings for newly provisioned data storage entities, the storage-management application 10 may provide an administrator with the ability to modify an existing authorization setting for a previously generated data storage entity. For example, an authorization setting for an existing data storage entity may indicate the administrator who initially generated the data storage entity. Accordingly, the storage-management application 10 will prevent modification of an authorization setting by any administrator other than the administrator indicated in the authorization setting as the administrator responsible for initially generating the data storage entity.

The storage system 14 on which the data storage entities reside may be a network-attached storage (NAS) system, or alternatively, a storage area network (SAN) system. Accordingly, the various network components (not shown) that make up the network 16 may vary depending upon the particular configuration of the storage system 14. For example, when configured as a NAS system, the network 16 may include conventional routers and/or switches for implementing file-based communication protocols, such as network file system (NFS), simple message block (SMB), and/or common internet file system (CIFS) protocols. Alternatively, the storage system 14 may be configured for use with a SAN, in which case the network 16 may include conventional SAN components for mapping SCSI (Small Computer System Interface) commands to a lower-level, block-based protocol, such as: Fiber Channel Protocol (FCP), iSCSI, HyperSCSI, Fiber Connectivity (FICON), or ATA (Advanced Technology Attachment) over Ethernet.

Referring again to FIG. 1, after the storage-management application 10 has generated the authorization setting for a newly provisioned data storage entity, the storage-management application 10 communicates the authorization setting to the storage system 14 where the authorization settings are stored. This may occur, for example, when a data storage entity is initially provisioned, such that the authorization settings are included in a communication to the storage system with any command or instruction for initially generating the data storage entity. Alternatively, if an administrator is modifying an authorization setting for an existing data storage entity, the modified authorization settings may be communicated to the storage system 14 after the data storage entity has been generated. Because the authorization settings are stored at the data storage system 14 along with the data storage entities, any storage-management application with access to the data storage system 14 is able to utilize the authorization settings and enforce the underlying security policy. Moreover, the authorization settings are independent of any host operating system, and persistent across host upgrades and/or host failures. For instance, if a particular host or server fails, or if a particular host or server is upgraded to a new or different operating system, the authorization settings maintained at the storage system are not affected.

In one embodiment of the invention, the authorization settings may be stored as a file by the storage system 14—for example, authorization settings file 28 in FIG. 1. Alternatively, the authorization settings may be stored in some other type of data structure, either on disk or in memory, at the storage system 14. Accordingly, host systems other than host system 12 can utilize the authorization settings by reading the authorization settings from the storage system. In one embodiment of the invention, the authorization settings for all data storage entities hosted by the storage system are stored in one data structure (e.g. authorization settings file 28). Alternatively, there may be multiple data structures at the storage system 14 for storing authorization settings, such that the authorization settings for each data storage entity are stored in a separate data structure. In one embodiment, the authorization settings are stored at the storage system in a data structure separate from any data structure representing the data storage entity itself. Accordingly, the storage system itself need not be customized in in order to implement and support the security policy.

Figure 2:
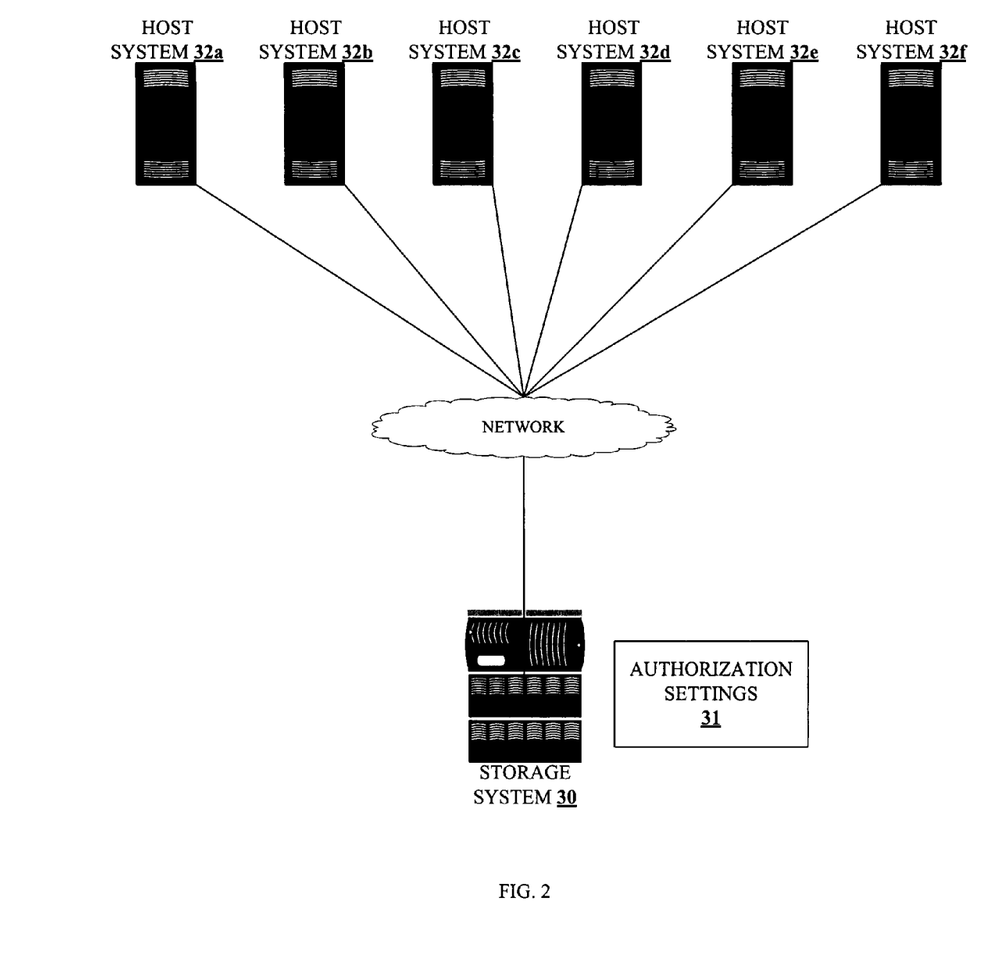
FIG. 2 illustrates an example of a network environment with multiple hosts, each host having a storage-management application configured to control access to data storage entities on a data storage system utilizing authorization settings stored at the data storage system, according to an embodiment of the invention.

As described above, the authorization settings generated by one storage-management application can be used by any number of other storage-management applications. FIG. 2 illustrates an example of a storage system 30 configured to provide data storage services to multiple host computer systems 32(a-f), according to an embodiment of the invention. As illustrated in FIG. 2, the storage system 30 has one data structure for storing authorization settings 31 for users of all host systems 32(a-f). Accordingly, an authorization setting established utilizing a storage-management application executing at host system 32a will be enforced by a storage-management application executing at host system 32b, and so on. For instance, a first administrator may use a storage-management application residing and executing on host system 32a to provision a volume, with authorization settings, on the storage system 30. The authorization settings for that newly provisioned volume are stored at the storage system 30. If a second administrator, using a storage-management application residing and executing at host 32b attempts to perform a provisioning operation on the newly provisioned volume (e.g., renaming or resizing the volume), the storage-management application on host 32b will read the authorization settings for the volume from the storage system 30 to determine whether the second administrator has the proper authorization to perform the requested provisioning operation. If the authorization setting for the volume indicates the second administrator is authorized to perform the requested provisioning operation, the storage-management application executing on host 32b will allow the provisioning operation to be performed. However, if the authorization settings for the volume indicate that the second administrator is not authorized to perform the provisioning operation, the storage-management application executing on host 32b will not allow the provisioning operation to be performed.

In one embodiment of the invention, the storage-management application enables an administrator to generate authorization settings for all users within a particular domain, in addition to the local host users. For instance, as illustrated in FIG. 2, the various hosts 32a-f may be organized and/or configured to belong to a common domain—a group of computers configured to share one or more resources, such as a network. In one embodiment of the invention, a storage-management application executing on one host (e.g., 32a) can generate authorization settings for a user of another host in the same domain. As such, an administrator may utilize a storage-management application executing on host 32a to generate an authorization setting that affects an administrator who uses a different host (e.g., host 32b) in the same domain. In general, an authorization setting established for any user will be enforced by each host system that belongs to the domain.

Figure 3:
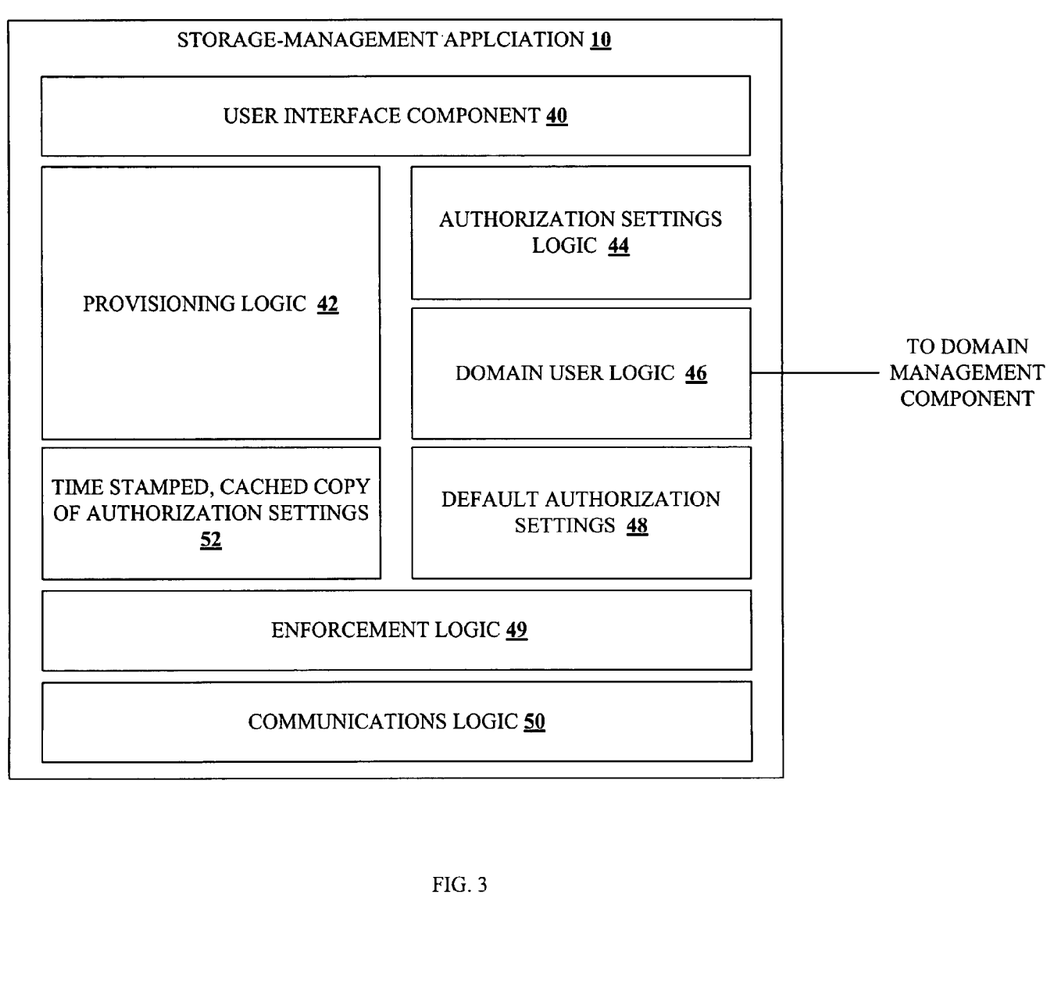
FIG. 3 illustrates a logical block diagram of a storage-management application according to an embodiment of the invention.

FIG. 3 illustrates a logical block diagram of a storage-management application 10 according to an embodiment of the invention. As illustrated in FIG. 3, a storage-management application 10 includes a user interface component 40. In general, the user interface component 40 works in conjunction with the host operating system to provide a mechanism for receiving and displaying information. Accordingly, the user interface component 40 may utilize portions of the host operating system to display and receive information in the windows of a graphical user interface (GUI). In an alternative embodiment of the invention, the storage-management application 10 may utilize a command line interface provided by the host operating system.

In one embodiment of the invention, the user-interface component 40 works in conjunction with the provisioning logic 42 and the authorization settings logic 44. For example, user-input received via the user interface component 40 is utilized by the provisioning logic 42 to generate commands or instructions that are communicated from the storage-management application 10 to the data storage system 14. The commands may include, for example, instructions for creating, deleting, renaming, or resizing a data storage entity. Similarly, the commands may include instructions for connecting to, or disconnecting from, a particular data storage entity, or displaying or listing information associated with one or more data storage entities, such as, for example, the administrator responsible for initially generating the data storage entity.

In addition to working in conjunction with the provisioning logic 42, the authorization settings logic 44 may utilize user-input to generate authorization settings for a new or existing data storage entity. For instance, user-input received via the user interface component 40 may be utilized by the authorization settings logic 44 to format a command or instruction to be communicated to a data storage system. Such a command or instruction may be used to add or modify an authorization setting to a data structure (e.g., a file) at the storage system for a particular data storage entity.

In one embodiment of the invention, the authorization settings logic 44 utilizes a domain user logic 46 to connect to a domain management component (not shown). For instance, the storage-management application 10 may extract user information from a domain management component for the purpose of generating and/or formatting an authorization setting or a command used to generate or modify an authorization setting. The domain management component may reside on the same host or a different host than where the storage-management application resides. By way of example, the domain user logic 46 may extract user information from a domain management component (not shown) and provide an administrator with a list of domain users. The administrator can then select from the list of users the particular users to be included in an authorization setting, where including a user in an authorization setting may grant or prohibit a user from performing certain provisioning operations.

The default authorization settings 48 provide the authorization settings logic 44 with default authorization settings to use with newly provisioned data storage entities in the case when an administrator does not provide custom authorization settings. For example, when provisioning a new data storage entity, an administrator may be prompted to provide custom authorization settings for the new data storage entity. If the administrator elects not to provide any custom authorization settings, the storage-management application may utilize default authorization settings for the newly provisioned data storage entity. The default authorization settings 48 may be customized for each type of data storage entity. For example, the default authorization settings for a volume may differ from the default settings for a LUN. This is necessarily the case when the set of possible provisioning operations differ between data storage entities. For instance, the set of possible provisioning operations for a volume may be different from those for a LUN, and so forth.

The communications logic 50 of the storage-management application 10, in conjunction with the communication logic of the host operating system (not shown), enables communication with data storage systems. For example, in certain embodiments of the invention, the communications logic 50 of the storage-management application 10 may provide a high-level communication function that is not provided by the underlying host operating system. Together, the communications logic 50 and the host operating system provide a mechanism for communicating data over a network between the host and one or more storage systems.

Not only does the storage-management application 10 enable an administrator to generate authorization settings for a data storage entity, but the storage-management application also enforces the underlying rules defined by the authorization settings. For instance, the storage-management application 10 includes enforcement logic 49 for enforcing the rules embodied in the authorization settings located on the data storage system 14. Accordingly, when an administrator attempts to perform a provisioning operation on an existing data storage entity via the storage-management application 10, the enforcement logic 49 verifies that the administrator initiating the request has the proper authorization, as indicated by the authorization settings, to perform the requested operation on the data storage entity. For instance, if an administrator attempts to change the name of an existing volume, or resize an existing volume, the enforcement logic 49 analyzes the authorization settings of the existing volume to ensure that the requesting administrator is authorized to perform the requested operation.

In general, when a user of the storage-management application requests to perform a provisioning operation on an existing data storage entity, the authorization policy enforcement logic 49 of the host retrieves all, or a portion of, the authorization settings from the data storage system 14. For example, when an administrator requests to perform a provisioning operation on an existing data storage entity, the enforcement logic communicates a request to the storage system 14 to retrieve the relevant authorization setting information for the existing data storage entity. In one embodiment of the invention, in response to the request, the authorization settings for all data storage entities may be communicated from the storage system to the storage-management application. Alternatively, in one embodiment of the invention, the storage system may communicate to the storage-management application only the particular authorization setting for the data storage entity on which the administrator has requested the provisioning operation be performed. In any case, after the enforcement logic 49 analyzes the relevant authorization setting information, the enforcement logic 49 will allow or prohibit the requested operation, depending on whether the requesting administrator has the proper authority to perform the operation.

In one embodiment of the invention, the storage-management application 10 may maintain a locally cached copy of authorization settings 52. For instance, in one embodiment of the invention, a copy of the authorization settings for all data storage entities may be maintained locally at the host, so as to prevent the storage-management application 10 from having to request an authorization setting from the storage system each time a provisioning command is initiated by an administrator. In this case, the locally cached copy of the authorization settings 52 may include a time stamp indicating when the authorization settings were copied to the local host. Accordingly, the enforcement logic 49 may utilize the time stamp to verify whether the locally cached authorization settings are current and valid prior. In one embodiment of the invention, instead of maintaining a complete copy of the authorization settings locally at the host, only those authorization settings for the particular data storage entities on which an administrator has performed a provisioning operation are maintained locally. In this case, each individual copy of an authorization setting maintained at the local host will have its own timestamp indicating the validity of the locally-cached setting.

Figure 4:
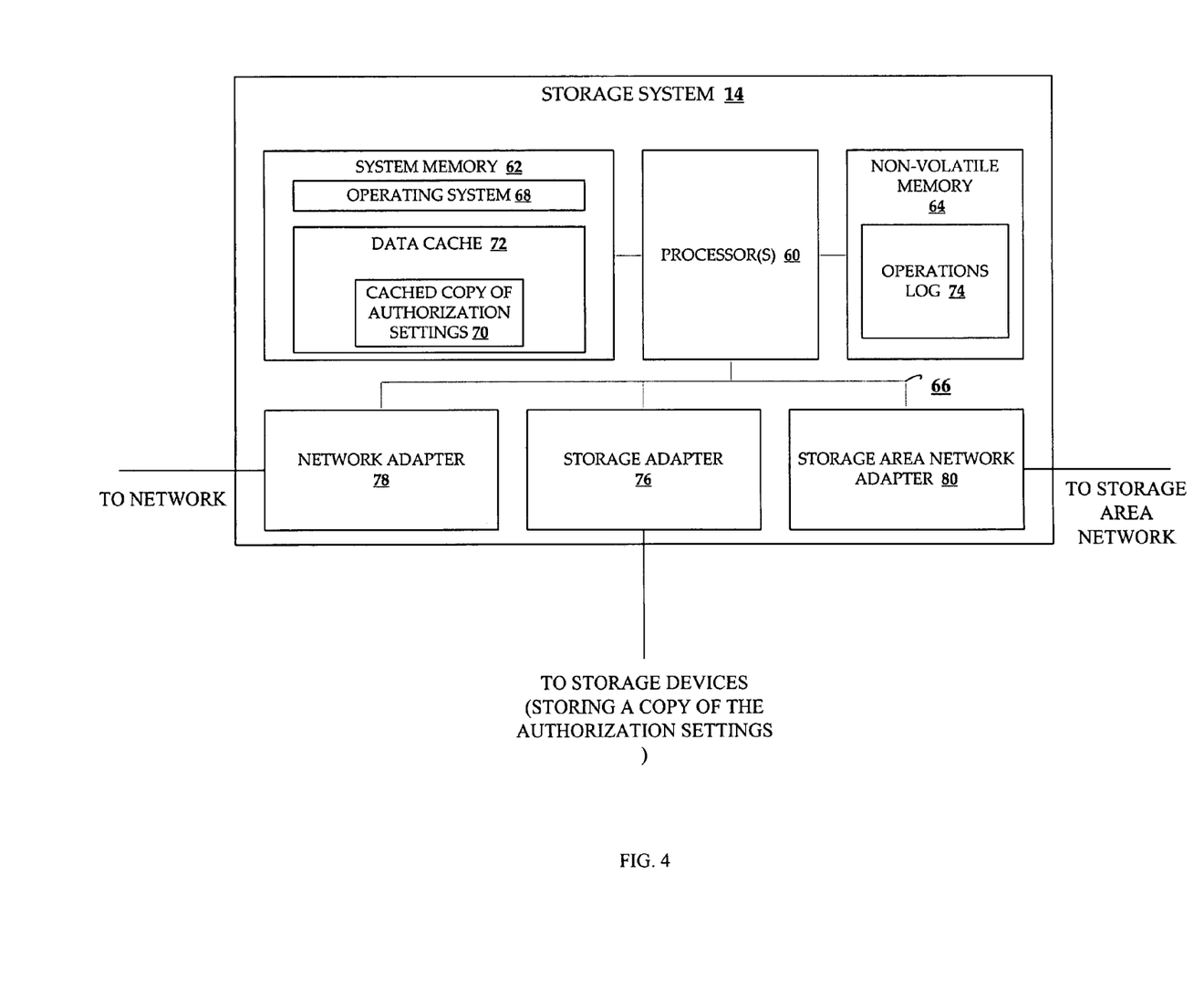
FIG. 4 illustrates an example of a data storage system storing authorization settings, according to an embodiment of the invention.

FIG. 4 illustrates an example of a data storage system 14 storing authorization settings 70 for data storage entities, according to an embodiment of the invention. In FIG. 4, certain standard and well-known components which are not necessary for understanding and/or implementing the present invention have been left out so as to avoid obscuring the invention in unnecessary detail. Although the storage system 14 illustrated in FIG. 4 is meant to be representative of a typical storage system, in one particular embodiment of the invention the storage system is consistent with storage systems (sometimes referred to as a "filers") designed by Network Appliance, Inc. of Sunnyvale, Calif.

As illustrated in FIG. 4, the storage system 14 includes one or more processors 60 coupled to system memory 62 as well as a non-volatile memory 64 by means of a bus system 66. The bus system 66 shown in FIG. 4 is an abstraction that represents any one or more separate physical buses and/or point-to-point connections, connected by appropriate bridges, adapters and/or controllers. The bus system 66, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 60 are the central processing units (CPUs) of the storage system 14 and, thus, execute instructions and control the overall operation of the storage system 14. In certain embodiments, the processor(s) 60 accomplish this by executing software instructions (e.g., applications or procedures) stored in system memory 62. The processor(s) 60 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The system memory 62 is or includes the main memory of the storage system 14. The system memory 62 represents any form of random access memory (RAM), read-only memory (ROM), flash memory, or the like, or a combination of such devices. The system memory 62 stores, among other things, portions of the operating system 68 of the storage system 14. In one embodiment of the invention, the operating system 68 of the storage system is a version of the Data ONTAP® operating system developed by Network Appliance of Sunnyvale, Calif. In addition, the system memory 62 may store a copy of the authorization settings 70 in a data cache 72. The authorization settings 70 may also be stored at an attached storage device (e.g., a disk drive). However, maintaining a copy of the authorization settings in system memory increases the performance of the storage system 14 when a variety of host systems are requesting the authorization settings.

In addition to the system memory 62, the storage system 14 may include a non-volatile memory 64. In contrast to the system memory 62, the non-volatile memory 64 maintains its data contents in the absence of power. Accordingly, the non-volatile memory 64 includes an operations log 74 for storing client-initiated transactions that have been committed to the block data cache 72 of the system memory 62, but not yet flushed (e.g., written) to the appropriate storage device.

Also connected to the processor(s) 60 through the bus system 66 are one or more internal mass storage devices (not shown), a storage adapter 76, a network adapter 78, and a storage area network adapter 80. The internal mass storage device may be or include any conventional medium for storing large volumes of data in a non-volatile manner, such as one or more magnetic- or optical-based disks. The storage adapter 76 allows the storage system 14 to access the storage devices of the storage subsystem and may be, for example, a Fibre Channel adapter or a SCSI adapter. Although the storage system 14 is shown in FIG. 4 as having both a network adapter 78 and a storage area network adapter 80, depending upon the particular embodiment, the storage system may have one or the other, or both. If configured as a NAS system using file-based communication protocols, the network adapter 78 provides the storage system 14 with the ability to communicate with remote devices, such as clients, over the network and may be, for example, an Ethernet adapter. Alternatively, if configured as a SAN system, the storage area network adapter 80 may facilitate communication to and from a network using block-based protocols.

According to an embodiment of the invention, the storage system 14 receives commands or instructions (via network adapter 78 or storage area network adapter 80) from a storage-management application executing on a host system. The commands or instructions may direct the storage system 14, for example, to generate a new data storage entity, and to add authorization settings for the data storage entity to a data structure that is storing authorization settings for all data storage entities of the storage system. The authorization settings determine which administrators are authorized to perform certain provisioning operations on the various data storage entities of the storage system.

Figure 5:
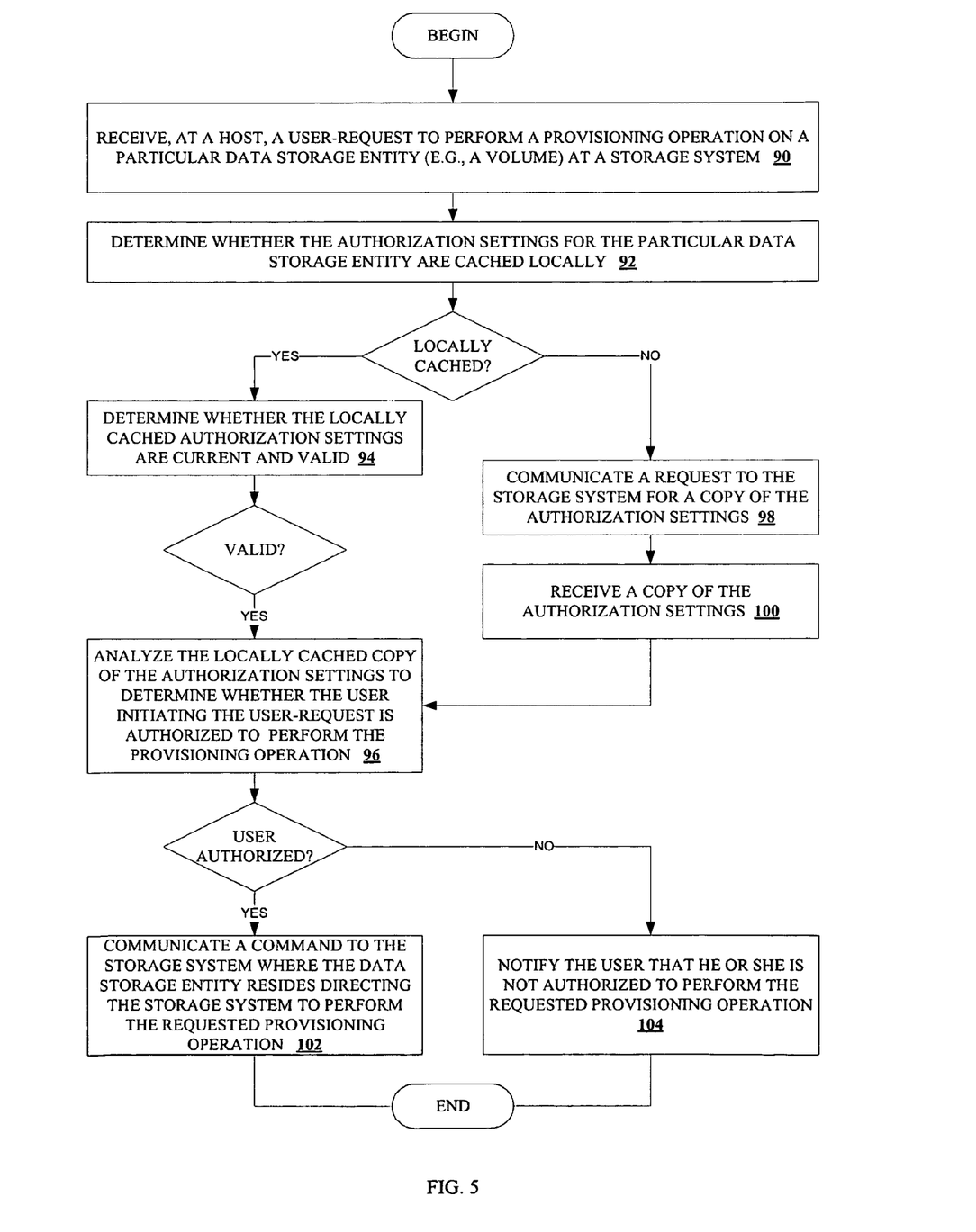
FIG. 5 illustrates a method, according to an embodiment of the invention, by which a storage-management application performs a provisioning operation on a data storage entity with authorization settings.

FIG. 5 illustrates a method, according to an embodiment of the invention, by which a storage-management application performs a provisioning operation on a data storage entity with authorization settings. At method operation 90, a storage-management application executing at a host receives a request from a user to perform a provisioning operation on a particular data storage entity. For example, the user may request that the host perform a provisioning operation to connect a previously generated LUN on the storage system to the host, so that the host can utilize the LUN as a virtual disk. Alternatively, the user may request a provisioning operation to rename, or resize, an existing volume on the storage system. In general, the provisioning operation may be one of any number of operations supported by the storage-management application.

Next, at method operation 92 the storage-management application 10 determines whether the authorization settings associated with the particular data storage entity subject to the user-request are stored locally. For instance, the storage-management application may check a locally-cached copy of authorization settings to determine whether the authorization settings for the particular data storage entity subject to the user-request are stored locally. If so, at method operation 94 the storage-management application determines whether the locally-cached authorization setting is current and valid. For instance, the locally-cached authorization setting may include a timestamp which indicates the validity of the authorization setting. Accordingly, the storage-management application may verify that the locally-cached copy of the authorization setting for the particular data storage entity is current by comparing the timestamp with a corresponding timestamp stored at the storage system. If, for example, the timestamps are equivalent, it may indicate the locally-cached authorization setting is current and valid. Consequently, the storage-management application can utilize the locally-cached copy of the authorization setting for the data storage entity without requesting the authorization setting from the storage system.

Next, at method operation 96 the storage-management application analyzes the authorization setting for the data storage entity that is subject to the user-requested provisioning operation to determine whether the user who initiated the user-request is authorized to perform the requested provisioning operation. If the authorization settings for the data storage entity indicate the user is authorized to perform the requested provisioning operation on the particular data storage entity, the storage-management application, at method operation 102, communicates a command to the storage system directing the storage system to perform the requested provisioning operation. For example, if the provisioning operation is to rename or resize a volume residing at the storage system, the command issued to the storage system will result in the storage system modifying the attributes of the volume accordingly. However, if the authorization setting for the data storage entity indicates that the requesting user is not authorized to perform the requested provisioning operation, the storage-management application, at method operation 104, presents a notification to the user indicating that the user does not have the proper authorization to perform the requested operation.

If the authorization setting for the data storage entity is not stored locally at the host, the storage-management application retrieves the authorization settings from the storage system where the data storage entity resides. For instance, as indicated in FIG. 5 at method operation 98, when the authorization setting for the particular data storage entity is not stored locally within the cached copy of authorization settings at the host, the storage-management application communicates a request to the storage system for a copy of the relevant authorization setting. At method operation 100, the storage-management application receives a copy of the requested authorization setting. The storage-management application may then store the authorization setting locally such that, if a subsequent operation is directed to the particular data storage entity, the authorization setting for that data storage entity will be available locally at the host.

Figure 6:
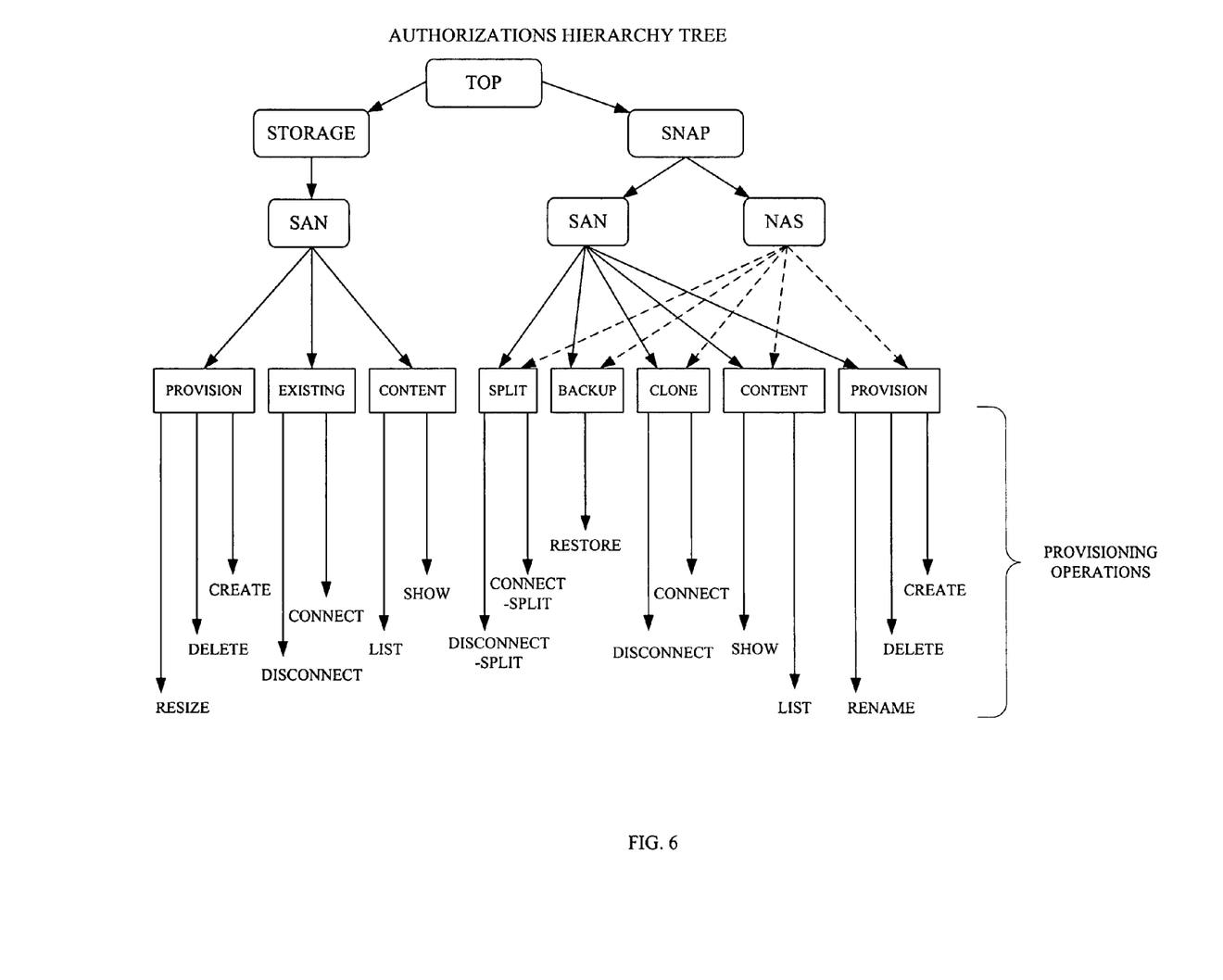
FIG. 6 illustrates an authorizations hierarchy tree demonstrating how various provisioning operations may be organized and assigned to individual users or groups in an authorization setting, according to an embodiment of the invention.

FIG. 6 illustrates an authorizations hierarchy tree demonstrating how authorizations for various provisioning operations may be organized and assigned to individual users or groups in an authorization setting, according to an embodiment of the invention. As illustrated in FIG. 6, the authorizations hierarchy tree includes a top level node (e.g., "TOP") with several children or sub-nodes. Each node corresponds with a grouping of provisioning operations. For example, the first two sub-nodes—"STORAGE" and "SNAP"—represent a division of provisioning operations by their basic functionality. In this case, the provisioning operations falling under sub-node "SNAP" are provisioning operations which may typically be used by a backup administrator to perform backup operations, such as creating a snapshot, or restoring data from a snapshot, and so on. The provisioning operations falling under the sub-node "STORAGE" are provisioning operations which may be used by an administrator to generate certain data storage entities, such as volumes, or LUNs. As described in greater detail below, an authorization setting can be created by associating a particular node or sub-node with a particular user, such that the particular user will be authorized to perform (or, depending upon the format of the rule, prohibited from performing) all of the provisioning operations associated with that node or sub-node. For example, the top level node of the tree, "TOP", includes all of the provisioning operations, while the node, "TOP.STORAGE.SAN.PROVISION", corresponds with only a subset of provisioning operations to include, "Create", "Delete", and "Resize". By assigning a user the node, "TOP", in an authorization setting for a given data storage entity, that user will be authorized to perform all of the provisioning operations associated with that node—in this case, all provisioning operations. Similarly, by assigning a user the node, "TOP.STORAGE.SAN.PROVISION", in an authorization setting, the user will be authorized to perform only the provisioning operations associated with that node—in this case, "Create", "Delete", and "Resize".

The authorizations hierarchy tree of FIG. 5 is organized such that each provisioning operation may be specific to a particular data storage entity type and/or a particular storage-management application, or a particular configuration. For instance, if a user is assigned an authorization level associated with the node, "TOP.SNAP.SAN", the user is allowed to perform all "SNAP" provisioning operations for SAN configurations, but not NAS configurations. However, if a user is assigned an authorization level associated with the node, "TOP.SNAP.SAN.EXISTING", the authorized operations are only "Connect", and "Disconnect" (operations that are specific to existing data storage entities).

In one embodiment of the invention, an authorization setting for a particular data storage entity may be specified by resource (e.g., data storage entity), user, and authorizations. For example, an authorization setting may be specified as a rule, as follows:

{<resource>, user@<mac-addr-host>/user@nisdomain, <set of authorizations>}

In this example, a user is uniquely specified by his or her user name and the Media Access Control (MAC) address of a host, or alternatively, as a user name associated with a particular domain.

In one embodiment of the invention, a rule may be specified as an "ALLOW" rule, such that the provisioning operations associated with a particular node in the authorizations hierarchy tree are allowed when that node is associated with a user. For example, if a user is assigned an authorization level corresponding with the node "TOP" in an ALLOW rule, then that user is allowed to perform all of the provisioning operations associated with the node "TOP". Similarly, a rule may be specified as a "DISALLOW" rule, such that the user is prohibited from performing any of the provisioning operations associated with the node assigned to that user in the rule. For example, in a DISALLOW rule where a user is assigned an authorization level associated with the node "TOP.STORAGE.SAN.CONTENT", the user will be prohibited from performing the provisioning operations associated with the node "TOP.STORAGE.SAN.CONTENT"—in this case, the provisioning operations "SHOW" and "LIST". Further examples are provided in the table of FIG. 7 which is described below.

Figure 7:
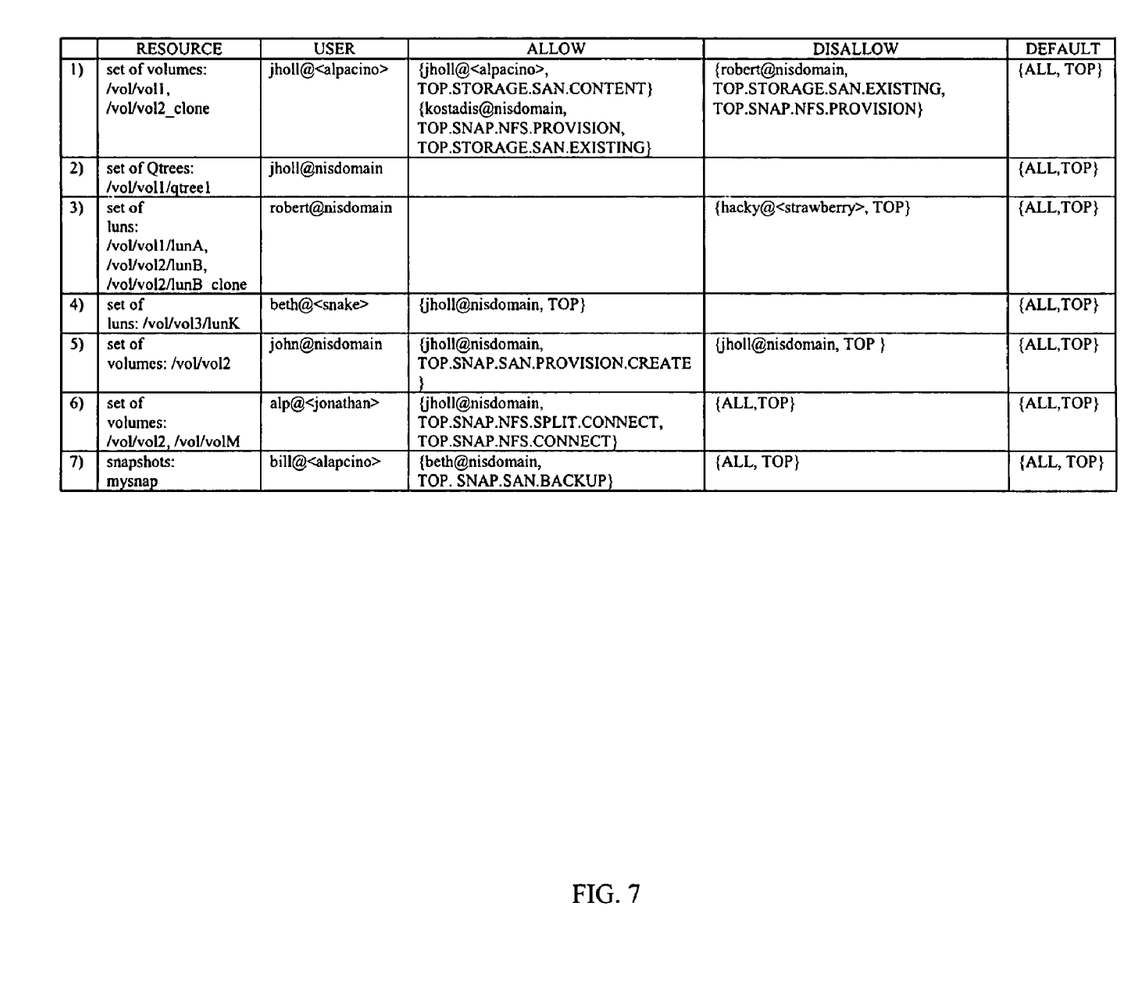
FIG. 7 illustrates a table showing example rules for specifying various authorization settings, according to an embodiment of the invention.

Referring to rule 1 of the table in FIG. 7, the resource is specified as the set of volumes with names "vol1" and "vol2_clone". As indicated by the USER column, the user responsible for generating the rule is "jholl@<alpacino>". Accordingly, only user "jholl@<alpacino>" will have the authority to modify rule 1. As indicated by the rule specified in the ALLOW column—{jholl@<alpacino>, TOP.STORAGE.SAN.CONTENT}—the user "jholl@<alpacino>" is allowed to perform the provisioning operations associated with the authorization level correspongin to the node, "TOP.STORAGE.SAN.CONTENT". Referring again to FIG. 6, the particular provisioning operations associated with the node "TOP.STORAGE.SAN.CONTENT" include "SHOW" and "LIST". Accordingly, user "jholl@<alpacinio>" is allowed to show or list the volumes with names "vol1" and "vol2_clone". In addition, the rule "{kostadis@nisdomain, TOP.SNAP.NFS.PROVISION, TOP.STORAGE.SAN.EXISTING}", which is also in the ALLOW column, indicates that the user with user name "kostadis@nisdomain" has the authorization level associated with the node "TOP.SNAP.NFS.PROVISION" and "TOP.STORAGE.SAN.EXISTING". Accordingly, the user "kostadis@nisdomain" is allowed to use the volumes for NFS and for storage connect and disconnect of file systems or disk groups or host volumes built on LUNs created in these volumes in SAN environments. As indicated for rule 1 in FIG. 7 in the DISALLOW column, the user "robert@nisdomain" is prohibited from performing a storage connect or disconnect in SAN environments, and snap create, delete or rename operations in NFS environments. Finally, as indicated in the default column, other users are allowed to perform all operations, as indicated by the authorization "TOP" associated with users "ALL".

For rule 2, there are no rules specified in the ALLOW or DISALLOW column. Accordingly, all operations are allowed for all users, while no operations are denied to any users for the set of qtrees indicated in the RESOURCE column (e.g., "/vol/vol1/qtree1").

For rule 3, user "hacky@strawberry" is prohibited from performing all provioning operations for the set of LUNs indicated in the resource column, while all others are allowed, by default, to perform all operations. For rule 4, user "jholl@nisdomain" is allowed to perform all operations for the specified set of LUNs (i.e., "/vol/vol/3/lunK"), while all others are allowed to perform all operations by default.

As shown in FIG's 6 and 7, provisioning operations may be logically mapped to nodes using an authorizations hierarchy tree, and then assigned to individual users, according to an embodiment of the invention. The particular authorization hierarchy tree illustrated in FIG. 6 is but one example of how provisioning operations may be organized and authorization settings defined. Those skilled in the art will appreciate that a great number of alternative mapping and assignment mechanisms may be used to specify authorizations and assign them to users.

The foregoing description of various implementations of the invention has been presented for purposes of illustration and description. It is not exhaustive and does not limit the invention to the precise form or forms disclosed. Furthermore, it will be appreciated by those skilled in the art that the present invention may find practical application in a variety of alternative contexts that have not explicitly been addressed herein.

What is claimed, is:

1. A computer-implemented method, comprising:
generating, at a first host executing a first storage-management application, an authorization setting indicating those provisioning operations, if any, that a user is permitted to perform on a data storage entity of a storage system; wherein the data storage entity is any type of logical container of data used by the storage system to store data; and
sending the authorization setting from the first host to the storage system to enable the storage system to provide the authorization setting to a second storage-management application executing on a second host when a user initiates a request to perform a provisioning operation on the data storage entity via the storage-management application; and
wherein, after sending the authorization from the first host to the storage system, the second host analyzes an indicator to verify that a locally-cached copy of the authorization setting is valid and analyzes the authorization setting to verify that the user associated with the request has the proper authority to perform the requested provisioning operation.

2. The computer-implemented method of claim 1, wherein the authorization setting is independent of any host- or server-specific roles assigned to a user, and any user name and/or password assigned to a user, a storage-management application, or a storage system.

3. The computer-implemented method of claim 1, wherein the authorization setting is to be stored at the storage system in a data structure separate from a data structure representing the data storage entity.

4. The computer-implemented method of claim 1, further comprising:
prior to sending the authorization setting from the first host to the storage system, sending a provisioning operation command from the first host to the storage system, the provisioning operation command directing the storage system to generate the data storage entity at the storage system.

5. The computer-implemented method of claim 1, wherein the first host is the same as the second host and the first storage-management application is the same as the second storage-management application.

6. The computer-implemented method of claim 1, wherein the indicator is a timestamp.

7. The computer-implemented method of claim 1, wherein the data storage entity is a disk group, a LUN, a volume, a qtree, or a snapshot.

8. The computer-implemented method of claim 1, wherein the authorization setting indicates whether a first user has authority to display information pertaining to a data storage entity initially provisioned by a second user.

9. The computer-implemented method of claim 1, wherein the authorization setting indicates whether a first user has authority to perform a backup operation on a data storage entity initially provisioned by a second user.

10. The computer-implemented method of claim 1, wherein the authorization setting indicates whether a first user has authority to clone a volume that was initially provisioned by a second user.

11. A computer-implemented method of claim 1, further comprising:
generating second authorization settings that indicate a first set of storage provisioning operations that a first administrative user is permitted to perform on said data storage entity and that indicate a second set of storage provisioning operations that a second administrative user is permitted to perform on said data storage entity, wherein the second set of provisioning operations is not identical to the first set of provisioning operations; and
sending the second authorization settings from the first host to the storage system to enable the storage system to provide the authorization setting to a storage-management application executing on any host.

12. The computer-implemented method of claim 1, wherein the user is a user of a second host in a same domain as the first host.

13. A computer-implemented method comprising:
receiving a request at a host-based storage-management application to perform a provisioning operation on a data storage entity stored by a data storage system communicatively coupled to the host via a network, wherein the data storage entity is any type of logical container of data used by the data storage system to store data; and
directing the storage system to perform the provisioning operation only after analyzing a locally-cached copy of an authorization setting associated with the data storage entity to determine whether an administrative user associated with the request has previously been granted authority to perform the provisioning operation involving the data storage entity; and
prior to analyzing the locally-cached copy of the authorization setting maintained at the host, analyzing an indicator to verify that the locally-cached copy of the authorization setting is valid.

14. The computer-implemented method of claim 13, wherein said authorization setting indicates those provisioning operations, if any, that a user is permitted to perform on the data storage entity of the storage system, and said authorization setting is independent of any host- or server-specific roles assigned to a user, and any user name and/or password assigned to a user, a storage-management application, or a storage system.

15. The computer-implemented method of claim 13, wherein said authorization setting is stored at the storage system, the method further comprising:
receiving from the storage system a copy of the authorization setting and storing the authorization setting in a local cache of the host resulting the locally-cached copy of the authorization setting.

16. The computer-implemented method of claim 13, wherein the indicator is a timestamp.

17. A system comprising:
a storage system that includes
a communications interface through which to communicate via a network with a first host system that includes a first storage-management application and a second host system that includes a second storage-management application, the first storage-management application and the second storage-management application configured to i) facilitate generating data storage entities on the storage system, and ii) generate authorization settings for the data storage entities of the storage system;
logic to receive the authorization settings from the first host system or the second host system, wherein the authorization settings indicate those provisioning operations, if any, that a plurality of users are permitted to perform on a data storage entity stored by the storage system, and wherein the data storage entity is any type of logical container of data used by the storage system to store data; and
logic to store the authorization settings in the storage system; and
logic to provide the authorization settings to any one or more storage-management applications of a plurality of storage-management applications coupled to the network in response to user requests from the one or more storage-management applications to perform provisioning operations on the data storage entity.

18. The system of claim 17, wherein the first storage-management application is configured to analyze the authorization settings upon receiving a user-request to perform a provisioning operation and to enable the provisioning operation only if a user associated with the user-request has previously been granted authority to perform the provisioning operation, as indicated by the authorization settings.

19. The system of claim 17,
wherein the second storage-management application is configured to analyze the authorization settings upon receiving a user-request to perform a provisioning operation and to enable the provisioning operation only if a user associated with the user-request has previously been granted authority to perform the provisioning operation, as indicated by the authorization settings.

20. The system of claim 17, wherein the authorization settings indicate whether a first user has authority to display information pertaining to a data storage entity initially provisioned by a second user.

21. The system of claim 17, wherein the authorization settings indicate whether a first user has authority to perform a backup operation on a data storage entity initially provisioned by a second user.

22. The system of claim 17, wherein the authorization settings indicate whether a first user has authority to clone a value that was initially provisioned by a second user.

23. A non-transitory computer-readable storage medium having instructions stored thereon, which, when executed by a first computer, cause the first computer to perform a method comprising:
generating an authorization setting indicating those provisioning operations, if any, that a user is permitted to perform on a data storage entity of a storage system, wherein the data storage entity is any type of logical container of data used by the storage system to store data; and
sending the authorization setting from the first computer to the storage system to enable the storage system to provide the authorization setting to a storage-management application executing on a second computer when a user initiates a request to perform an operation on the data storage entity via the storage-management application; and
wherein, after said sending the authorization, the second computer analyzes the authorization setting to verify that the user associated with the request has the proper authority to perform the requested provisioning operation and an indicator to verify that a locally-cached copy of the authorization setting is valid.

24. A method comprising:
receiving, at a network storage system that provides network storage services to one or more clients, first and second authorization settings from at least one host executing at least one storage-management application on a network, the first authorization settings indicating a first set of storage provisioning operations that a first administrative user is permitted to perform on a data storage entity stored by the network storage system and a second set of storage provisioning operations that a second administrative user is permitted to perform on said data storage entity, and the second authorization settings indicating a third set of storage provisioning operations that the first administrative user is permitted to perform on a second data storage entity stored by the network storage system, wherein the second set of provisioning operations is not identical to the first set of provisioning operations and the third set of provisioning operations is not identical to the first set of provisioning operations;

storing the authorization settings in the network storage system; and providing at least some of the authorization settings from the network storage system to a particular storage-management application of a plurality of storage-management applications, in response to a user request received at the particular storage-management application to perform a provisioning operation on the data storage entity.

\* \* \* \* \*